(12) United States Patent
Fukuda (10) Patent No.: US 8,154,851 B2
(45) Date of Patent: Apr. 10, 2012

(54) DIELECTRIC CERAMIC, MANUFACTURING METHOD THEREOF, AND MULTILAYER CERAMIC CAPACITOR

(75) Inventor: Daisuke Fukuda, Kirishima (JP)

(73) Assignee: Kyocera Corporation, Kyoto (JP)

( * ) Notice: Subject to any disclaimer, the term of this patent is extended or adjusted under 35 U.S.C. 154(b) by 692 days.

(21) Appl. No.: 12/065,483

(22) PCT Filed: Aug. 25, 2006

(86) PCT No.: PCT/JP2006/316744
§ 371 (c)(1),
(2), (4) Date: Feb. 20, 2009

(87) PCT Pub. No.: WO2007/026614
PCT Pub. Date: Mar. 8, 2007

(65) Prior Publication Data
US 2009/0219666 A1    Sep. 3, 2009

(30) Foreign Application Priority Data
Aug. 29, 2005   (JP) .................................. 2005-248414

(51) Int. Cl.
*H01G 4/06* (2006.01)
(52) U.S. Cl. ................... 361/321.4; 361/321.5; 501/137
(58) Field of Classification Search .... 361/321.1–321.5, 361/311; 501/137–139
See application file for complete search history.

(56) References Cited

U.S. PATENT DOCUMENTS

| | | | | |
|---|---|---|---|---|
| 6,329,311 | B1 * | 12/2001 | Fujii et al. ..................... | 501/136 |
| 7,433,173 | B2 * | 10/2008 | Iwasaki et al. ............. | 361/321.4 |
| 7,501,371 | B2 * | 3/2009 | Sasabayashi et al. ......... | 501/138 |
| 2006/0114641 | A1 * | 6/2006 | Iwasaki et al. ............. | 361/321.4 |

FOREIGN PATENT DOCUMENTS

| | | |
|---|---|---|
| JP | 2002-265260 | 9/2002 |
| JP | 2002-293617 | 10/2002 |
| JP | 2003-146744 | 5/2003 |
| JP | 2003-238240 | 8/2003 |
| JP | 2005-022890 | 1/2005 |
| JP | 2005-022891 | 1/2005 |
| JP | 2005-187218 | 7/2005 |

OTHER PUBLICATIONS

Korean language office action and its English language translation for corresponding Korean application 20087003576.

* cited by examiner

*Primary Examiner* — Eric Thomas
(74) *Attorney, Agent, or Firm* — DLA Piper LLP (US)

(57) ABSTRACT

A dielectric ceramic includes primary crystal grains. The primary crystal grains include a composite oxide of Ti and at least one kind of alkaline earth metal element selected from Ca, Sr and Ba. The primary crystal grains contain metal compositions of Mg, Mn and a rare earth element. At least one of the metal composition of the Mg, the Mn and the rare earth element is present at a higher concentration on the surface side of the primary crystal grains than the inside thereof. A 0.04 to 0.2 parts by mass of Zr in terms of oxide to 100 parts by mass of the composite oxide is present. As a result, a high dielectric constant can be imparted even to finely granulated barium titanate based crystal grains.

5 Claims, 2 Drawing Sheets

DIELECTRIC CERAMIC, MANUFACTURING METHOD THEREOF, AND MULTILAYER CERAMIC CAPACITOR

TECHNICAL FIELD

The present invention relates to a dielectric ceramic, manufacturing method thereof, and a multilayer ceramic capacitor, and more particularly, relates to a dielectric ceramic exhibiting a high dielectric constant even if it is finely granulated, a manufacturing method thereof, and a multilayer ceramic capacitor configured by this dielectric ceramic.

BACKGROUND ART

In recent years, as mobile devices such as cellular phones are widely used and semiconductor devices as the main parts of personal computers and the like have higher speed and higher frequency, multilayer ceramic capacitors mounted on these electronics equipments are increasingly required to have smaller size and larger capacity.

To meet these requirements, the smaller layer thickness and the larger number of stacked layers have been attempted in dielectric layers constituting the multilayer ceramic capacitors. Therefore, crystal grains constituting the dielectric layers are required to have a high dielectric constant even if they are finely granulated and have less temperature dependence in dielectric constant. There have been developed such dielectric ceramics as disclosed in the following patent documents.

For example, Patent Document No. 1 discloses a dielectric ceramic obtained by complexing barium titanium zirconate in which a part of the titanium site within barium titanium used as a dielectric ceramic is replaced with zirconium, and bismuth sodium titanate in which the barium site is replaced with bismuth, sodium, and strontium.

Patent Document No. 2 discloses a dielectric ceramic obtained by replacing a part of the barium site within barium titanate with calcium, and replacing a part of the titanium site with zirconium, and then complexing these barium calcium titanium zirconate crystal grains having different calcium and zirconium compositions.

Patent Document No. 3 discloses a dielectric ceramic in which zirconia composition is contained in a proportion of 0.01 to 0.1 atomic percent with respect to 1 mole of a composite oxide of barium, bismuth and titanium.

Patent Document No. 4 discloses a dielectric ceramic in which 0.11 to 0.5 parts by mass of zirconia is contained with respect to 100 parts by mass of a dielectric ceramic composed of barium, titanium and a rare earth element.

Patent Document No. 1: Japanese unexamined patent publication No. 2005-22891
Patent Document No. 2: Japanese unexamined patent publication No. 2005-22890
Patent Document No. 3: Japanese unexamined patent publication No. 2003-238240
Patent Document No. 4: Japanese unexamined patent publication No. 2003-146744

DISCLOSURE OF THE INVENTION

Problems to be Solved by the Invention

However, in each of the above Patent Documents No. 1 to No. 4, the addition of zirconium composition to barium titanate as the main composition of the dielectric ceramic is not effective in improving the dielectric constant.

That is, in Patent Document No. 1, the dielectric constant shows a tendency to drop when increasing the ratio at which a part of the titanium site within barium titanate is replaced with zirconium.

Also in Patent Document No. 2, the dielectric constant is lowered in proportion to the amount of the replacement of zirconium composition in the composition on the side where the amount of the replacement of zirconium with respect to the titanium barium calcium titanium zirconate is small.

In Patent Document No. 3, the dielectric constant is lowered when the amount of zirconia is changed in the range of 0.05 to 0.12 in mole ratio with respect to 1 mole of the composite oxide of barium, bismuth and titanium.

In Patent Document No. 4, the dielectric constant shows a tendency to drop in the composition containing 0.05 to 0.5 parts by mass of zirconia with respect to 100 parts by mass of the dielectric ceramic composed of barium, titanium and the rare earth element.

That is, heretofore, there has been no report that dielectric constant is increased by incorporating a small amount of zirconium oxide into barium titanate based crystal grains.

The present invention therefore aims at providing a dielectric ceramic that can impart a high dielectric constant even to finely granulated barium titanate based crystal grains, and also stabilize the temperature characteristics of dielectric constant, and a method of manufacturing the dielectric ceramic, as well as a high capacity multilayer ceramic capacitor using the dielectric ceramic as a dielectric layer.

Means for Solving the Problems

A dielectric ceramic of the present invention has a feature (1) that the dielectric ceramic comprising a composite oxide, as primary crystal grains, composed mainly of Ti and at least one kind of alkaline earth metal element selected from Ca, Sr and Ba. The primary crystal grains contain metal compositions of Mg, Mn and a rare earth element, and at least one kind of the metal composition of the Mg, the Mn and the rare earth element is present at a higher concentration on the surface side of the primary crystal grains than the inside thereof. A concentration ratio thereof (the surface side/the inside) is at least 1.5 times, and 0.04 to 0.2 parts by mass of Zr in terms of oxide to 100 parts by mass of the composite oxide is contained.

Preferably, the dielectric ceramic has a feature (2) that the primary crystal grains comprise first crystal grains having a Ca concentration of not more than 0.2 atomic percent, and second crystal grains having a Ca concentration of not less than 0.4 atomic percent; and a feature (3) that the primary crystal grains have an average grain size of not more than 0.4 µm.

A method of manufacturing a dielectric ceramic according to the present invention has a feature (4) of adding 0.04 to 0.2 parts by mass of zirconium oxide to 100 parts by mass of a dielectric powder in which Mg, Mn and a rare earth element are coated on the surface of a composite oxide powder composed mainly of Ti and at least one kind of alkaline earth metal element selected from Ca, Sr and Ba, followed by forming and then sintering.

In the method of manufacturing a dielectric ceramic, there are preferably a feature (5) that the composite oxide powder is a mix powder of a barium titanate powder and a barium calcium titanate powder, and a feature (6) that the dielectric powder has an average grain size of not more than 0.3 µm.

A multilayer ceramic capacitor of the present invention has a feature (7) that there is provided with a capacitor body in which dielectric layers and internal electrode layers are alternately stacked one upon another, and the dielectric layers are the abovementioned dielectric ceramic.

Effects of the Invention

In accordance with the dielectric ceramic of the present invention, the dielectric ceramic can have a high dielectric constant, and the temperature characteristics of dielectric constant can be stabilized by incorporating 0.04 to 0.2 parts by mass of Zr in terms of oxide, namely as zirconium oxide, into the dielectric ceramic whose main constitutive mineral is barium titanate based crystal grains. By using this dielectric ceramic as a dielectric layer, it is easy to form a high capacity multilayer ceramic capacitor having good capacitance-temperature characteristics.

Specifically, in accordance with the heretofore disclosed related art, it has been known that owing to the effect of the addition of zirconium oxide to barium titanate based primary crystal grains, the dielectric constant in the vicinity of room temperature is increased when increasing the amount of the oxide of zirconium to be added (for example, refer to Patent Document No. 2). However, in most cases, when a small amount of the oxide of zirconium is added, dielectric constant is reversely lowered (for example, refer to Patent Documents Nos. 1 to 4).

On the contrary, in the present invention the barium titanate based primary crystal grains constituting the dielectric ceramic contain at least one kind of metal composition of Mg, Mn and a rare earth element, at a higher concentration on the surface side than the inside thereof, causing zirconium oxide to be added to exist in the vicinity of the surface thereof. Therefore, the crystal phase in the vicinity of the surfaces of the crystal grains can be formed as crystal grains having good ferroelectricity in which zirconium oxide is solid-dissolved.

Conventionally, when additives such as Mg, Mn and a rare earth element is contained in barium titanate, the crystal structure of barium titanate is changed to a crystal structure close to a cubic crystal not strongly exhibiting ferroelectricity due to the solid solution of the above added composition. In contrast, according to the dielectric ceramic of the present invention, the additives such as Mg, Mn and the rare earth element are contained in the vicinity of the surfaces of barium titanate crystal grains so as to be changed into crystal grains having a crystal phase exhibiting ferroelectricity, resulting in the increased dielectric constant. Also in the crystal grains according to the present invention, impurities such as Mg are present at a high concentration in the vicinity of the surfaces of these crystal grains, thereby preventing the added zirconium oxide from diffusing into the inside of the crystal grains.

Usually, when a different type of metal composition is solid dissolved in a dielectric powder, the barium titanate in the solid dissolved region will have low crystal tetragonality by the presence of a high concentration of the Y, and the like. Whereas in the present invention, zirconium oxide is solid dissolved, thereby forming barium titanium zirconate that exhibits a high dielectric constant at room temperature. This imparts a high dielectric constant to the region of the surface side of the crystal grains, which has been said to have a low dielectric constant. It is therefore able to improve the dielectric constant of the crystal grains as a whole. In addition to that, the diffusion of the additive compositions such as Y and zirconium oxide can be suppressed in the inside of the crystal grains, and the most part thereof still has crystal tetragonality. The dielectric ceramic composed of these crystal grains is therefore also capable of stabilizing the temperature characteristics of dielectric constant.

DETAILED DESCRIPTION OF PREFERRED EMBODIMENTS FOR CARRYING OUT THE INVENTION

<Dielectric Ceramic>

Figure 1:
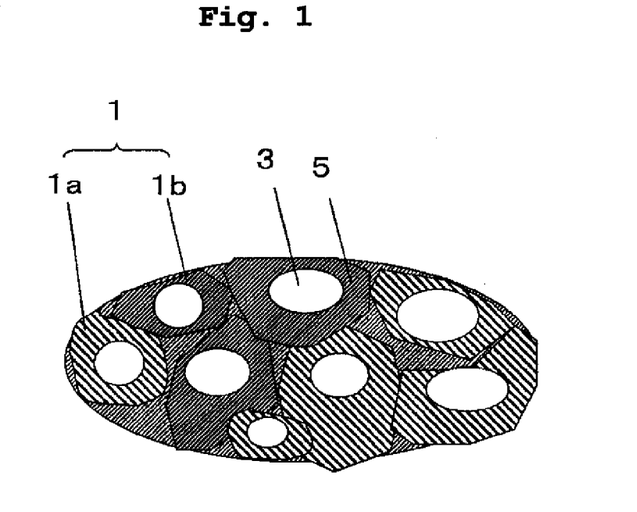
FIG. 1 is a longitudinal sectional view showing in enlarged dimension a part of a multilayer ceramic capacitor of one embodiment of the present invention.

Firstly, a dielectric ceramic of the present invention will be described in detail. FIG. 1 is a cross-sectional schematic drawing showing in enlarged dimension a part of the dielectric ceramic of the present invention. The dielectric ceramic of the present invention uses, as a main composing mineral, barium titanate based primary crystal grains 1. The constitutive composition thereof is a composite oxide composed mainly of Ti and at least one kind of alkaline earth metal element selected from Ca, Sr and Ba.

Preferably, the composite oxide is any one of barium titanate, strontium titanate, barium calcium titanate obtained by incorporating calcium into barium titanate, and barium strontium titanate obtained by incorporating strontium into barium titanate, or alternatively, those in which these crystal grains 1 are mixed.

When the composite oxide is primary crystal grains 1 composed mainly of the abovementioned barium titanate (Ba-TiO$_3$), there are the advantages that a high dielectric constant can be attained in the vicinity of room temperature, and the temperature characteristics of dielectric constant can be stabilized.

When the composite oxide is primary crystal grains 1 composed mainly of barium calcium titanate (Ba$_{1-x}$Ca$_x$TiO$_3$, X=0.01 to 0.2), there are the advantage that the temperature characteristics of dielectric constant is flat and the alternating-current field dependence of dielectric constant is high, and hence the dielectric constant can be increased by changing the alternating-current field.

Particularly, when the primary crystal grains 1 are the complex of barium titanate and barium calcium titanate each having the abovementioned individual characteristics, there are the advantages that the dielectric constant of a dielectric ceramic can be increased and the temperature characteristics of dielectric constant can be stabilized, and a high performance dielectric ceramic is produced which can increase dielectric constant by changing alternating-current field, permitting a further higher dielectric constant.

In this case, the complexed primary crystal grains 1 are preferably composed of first crystal grains 1a having a Ca concentration of not more than 0.2 atomic percent, and second crystal grains 1b having a Ca concentration of not less than 0.4 atomic percent. Under the coexistence of the first crystal grains 1a having a Ca concentration of not more than 0.2 atomic percent, and the second crystal grains 1b having a Ca concentration of not less than 0.4 atomic percent, the characteristics of both types of the crystal grains can be brought out, thereby attaining those having a high dielectric constant and having the stabilized temperature characteristics of dielectric constant. The reason for this is as follows. That is, as compared with the case of using only the first crystal grains 1a having a Ca concentration of not more than 0.2 atomic percent, and the case of using only the second crystal grains 1b having a Ca concentration of not less than 0.4 atomic percent, the coexistence of the abovementioned two types of crystal grains enables the dielectric constant at temperatures of 50° C. or above to approach the dielectric constant at room temperature, making it easy to satisfy X7R characteristics (the electrostatic capacity change rate in a temperature range of −55 to 125° C. is within ±15% according to EIA standard).

The first crystal grains 1a having a Ca concentration of not more than 0.2 atomic percent, and the second crystal grains 1b having a Ca concentration of not less than 0.4 atomic percent can be obtained by mixing and sintering a barium titanate ($BaTiO_3$) powder and a barium calcium titanate ($Ba_{1-x}Ca_x TiO_3$, X=0.01 to 0.2) powder.

The crystal grains 1 of the present invention contains the metal compositions of Mg, Mn and a rare earth element for the purpose of controlling the insulating property and the temperature characteristics of barium titanate based crystal grains.

It is for the present invention that at least one kind of metal composition of Mg, Mn and a rare earth element is present at a higher concentration on a surface side 5 of the primary crystal grains 1 than an inside 3 thereof. Under the condition that at least one kind of metal composition of the Mg, the Mn and the rare earth element is present at a higher concentration on the surface side 5 of the primary crystal grains 1 than the inside 3 thereof, the vicinity of the surfaces of the primary crystal grains 1 becomes a crystal phase having low ferroelectricity, whereas the inside 3 that occupies the most part of the primary crystal grains 1 remains a cubic crystal strongly exhibiting ferroelectricity possessed by the original barium titanate based primary crystal grains 1. Consequently, the dielectric constant of the primary crystal grains 1 can be increased as a whole.

In this case, the fact that at least one kind of the metal composition (element) of the Mg, the Mn and the rare earth element is present at a higher concentration on the surface side 5 of the primary crystal grains 1 than the inside 3 corresponds to the condition that the concentration ratio of the above element of the surface side 5 to the central part of the primary crystal grains 1 is 1.5 times or above.

The concentration ratio of the element existing in the primary crystal grains 1 can be obtained as a count ratio, by an electron probe micro-analyzer (EPMA) equipped with an electron microscope. On the analysis, the existing condition of the element is detected, while scanning the primary crystal grains 1 from the surface side 5 to the central part. In the element concentration on the surface side 5 of the primary crystal grains 1, the concentration value of a region located 2 to 5 nm inside from the surface is defined as the concentration of the surface side.

In this case, when the barium titanate based primary crystal grains 1 contain Mg in the range of 0.04 to 0.14 parts by mass, a rare earth element in the range of 0.2 to 0.9 parts by mass, and Mn in the range of 0.04 to 0.15 parts by mass, the temperature characteristics of the dielectric constant of the barium titanate based primary crystal grains 1 themselves can be stabilized, so that insulating property can be increased, and the reliability in a highly accelerated life test can be improved.

Here, the rare earth element is preferably at least one kind selected from La, Ce, Pr, Nd, Sm, Gd, Tb, Dy, Ho, Er, Tm, Yb, Lu, Y and Sc. Particularly, Y is preferred for the purpose of improving the reliability in the highly accelerated life test of the dielectric ceramic, while stabilizing the temperature characteristics of dielectric constant.

If the metal compositions such as Mg, Mn and a rare earth element are not present in the primary crystal grains 1, and if these metal compositions are present from the surface side 5 of the primary crystal grains 1 to the inside 3 thereof so as to have no difference in concentration, namely if the concentration ratio of the abovementioned elements of the surface side 5 to the central part in the primary crystal grains 1 is smaller than 1.5 times, the added zirconium oxide will be diffused into the inside 3 of the primary crystal grains 1, so that the crystal tetragonality of the barium titanate based primary crystal grains 1 themselves will be lowered as a whole, resulting in a low dielectric constant.

It is also desirable that the dielectric ceramic of the present invention contains zirconium in the amount of 0.04 to 0.2 parts by mass, preferably 0.06 to 0.1 parts by mass in terms of oxide, with respect to 100 parts by mass of the composite oxide composed of the abovementioned barium titanate based primary crystal grains 1.

When the amount of the oxide of zirconium is not less than 0.04 parts by mass, the oxide of zirconium can be solid dissolved in the vicinity of the surfaces of the barium titanate based primary crystal grains 1. Hence there is a merit to change the crystal phases in the vicinity of the surfaces of the primary crystal grains 1 into barium titanium zirconate having a high dielectric constant at room temperature, thus imparting a high dielectric constant to the primary crystal grains 1 as a whole.

The addition of zirconium oxide to the barium titanate based primary crystal grains 1 enables suppression of the grain growth of the barium titanate based primary crystal grains 1, thereby suppressing the grain growth even in the sintering in a furnace for mass production which has a wide temperature distribution. This decreases variations in dielectric constant and also increases insulating properties and the reliability in the highly accelerated life test.

When the amount of the oxide of zirconium is not more than 0.2 parts by mass, it is possible to reduce the amount of solid solution of the oxide of zirconium with respect to the core part of the inside 3, by which the barium titanate based primary crystal grains 1 is usually supposed to exhibit crystal tetragonality. Hence there is a merit to prevent the dielectric constant from being lowered throughout the primary crystal grains 1.

When the amount of the oxide of zirconium is less than 0.04 parts by mass, the oxide of zirconium cannot be solid dissolved in the vicinity of the surfaces of the barium titanate based primary crystal grains 1. This makes it difficult to change the crystal phases in the vicinity of the surfaces of the primary crystal grains 1 into barium titanium zirconate having a high dielectric constant at room temperature, failing to impart a high dielectric constant.

When the amount of the oxide of zirconium is more than 0.2 parts by mass, the oxide of zirconium is solid dissolved throughout the primary crystal grains 1, so that the primary crystal grains 1 can be changed into barium titanium zirconate having a high dielectric constant at room temperature, thus enhancing the temperature characteristics of dielectric constant of the dielectric ceramic.

The amount of zirconium oxide in the dielectric ceramic is measured as follows. After the dielectric ceramic is predissolved in solvent, ICP emission spectrochemical analysis is used to measure the amount of zirconium, along with barium, strontium, calcium and titanium as primary compositions of the crystal grains 1. In this case, as stoichiometric ratio, the amount of barium titanate is obtained from the amounts of barium, strontium, calcium and titanium. Then, the amount of zirconium oxide ($ZrO_2$) with respect to 100 parts by mass of the barium titanate is obtained.

Preferably, the primary crystal grains 1 constituting the dielectric ceramic of the present invention have an average grain size of not more than 0.4 µm. When the average grain size of the primary crystal grains 1 is not more than 0.4 µm, a large number of grain boundaries can be formed within the dielectric ceramic, enabling improvement in insulating properties as well as dielectric properties. On the other hand, the lower limit of the average grain size of the primary crystal grains 1 is preferably not less than 0.1 µm. When the average grain size of the primary crystal grains 1 is not less than 0.1 µm, it is easy to attain the primary crystal grains 1 having high crystal tetragonality, making it possible to increase the dielectric constant of the dielectric ceramic.

The average grain size of the primary crystal grains 1 is found by observing with an electron microscope a broken cross section of the dielectric ceramic, and analyzing the photograph of the obtained crystal structure by using an image analyzer (Macview). Specifically, the contours of individual crystal grains 1 appeared on the entire surface of the obtained photograph are drawn, and the areas of these contours are found. The obtained areas are then converted to circles, and the diameters of the individual grains are found, respectively. The diameters of the individual crystal grains 1 are averaged.

In the present invention, it is also preferable that the ratio of A site for barium or Ca to B site for titanium in the crystal grains 1 satisfy the relationship of $A/B \geqq 1.003$. More preferably, when the crystal grains 1 are crystal grains consisting of first crystal grains 1a having a Ca concentration of not more than 0.2 atomic percent, and second crystal grains 1b having a Ca concentration of not less than 0.4 atomic percent, the mole ratio of A site (barium) to B site (titanium) in the second crystal grains 1b having a Ca concentration of not less than 0.4 atomic percent is not less than 1.003. This is desirable because it is able to suppress the grain growth of the second crystal grains 1b having a Ca concentration of not less than 0.4 atomic percent, which are liable to cause grain growth.

It is also effective to add barium carbonate for the purpose of suppressing the grain growth of the barium titanate based crystal grains 1.

<Method of Manufacturing Dielectric Ceramic>

The method of manufacturing the dielectric ceramic of the present invention will next be described. Firstly, a composite oxide powder is prepared which is composed mainly of Ti and at least one kind of alkali earth metal element selected from Ca, Sr and Ba. Then, the process of coating Mg, Mn and a rare earth element on the surface of the composite oxide powder is performed to prepare a dielectric powder coated with the Mg, the Mn and the rare earth element. In this case, the coating process of the Mg, the Mn and the rare earth element on the composite oxide powder is performed by mixing while heating the aqueous solution of the Mg, the Mn and the rare earth element with the composite oxide powder.

Subsequently, the obtained coated powder and a zirconium oxide powder are mixed in solvent, such as water or alcohol, in which the coated powder and the zirconium oxide powder cannot be dissolved. In this case, the amounts of the coated powder and the zirconium oxide powder to be mixed correspond to the abovementioned composition of the dielectric ceramic. The average grain size of the dielectric powder thus prepared is preferably not more than 0.3 µm. When the average grain size of the dielectric powder is not more than 0.3 µm, it becomes easy to reduce the thickness of dielectric layers constituting the multilayer ceramic capacitor or the like. On the other hand, the average grain size of the dielectric powder is preferably not less than 0.2 µm. When the average grain size of the dielectric powder is not less than 0.2 µm, it is easy to become powder having high crystal tetragonality, making it easy to attain a high dielectric constant. In cases where a plurality of types of dielectric powders having different Ca concentrations are mixed and used, all of these dielectric powders are preferably coated for the purpose of increasing the dielectric constant in the respective sintering temperatures.

The obtained mixed powder is then formed in a tablet shape by a former, and sintered under predetermined heating conditions.

<Multilayer Ceramic Capacitor>

Figure 2:
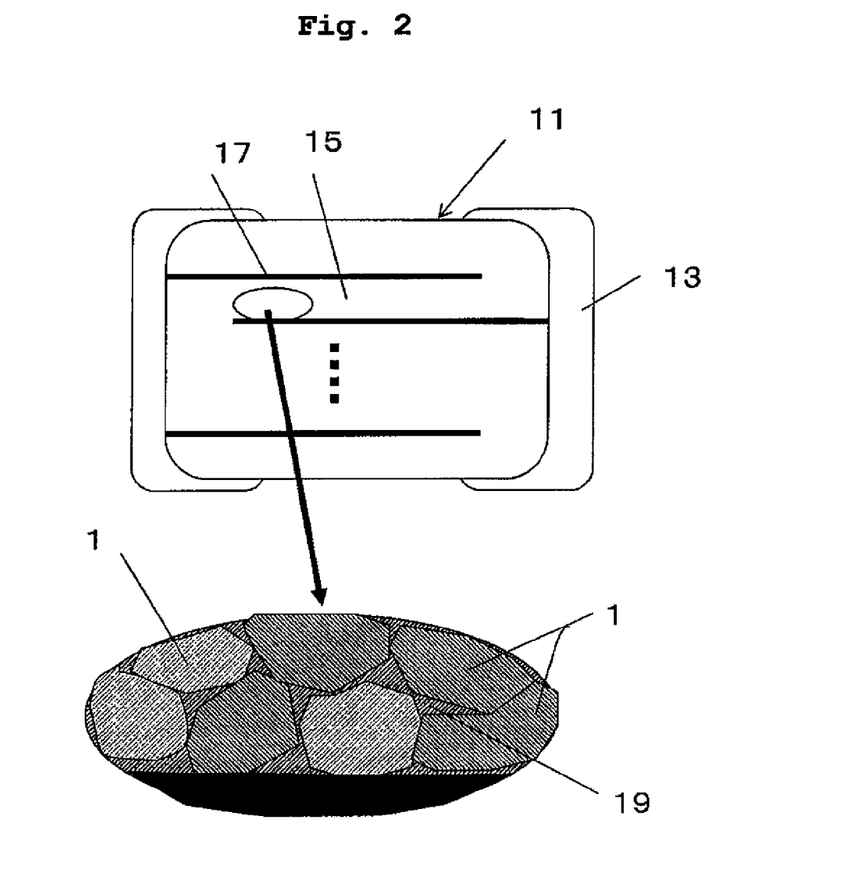
FIG. 2 is a longitudinal sectional view with a partially enlarged view of the multilayer ceramic capacitor of one embodiment of the present invention.

The multilayer ceramic capacitor of the present invention will be described in detail with reference to the schematic sectional view of FIG. 2. FIG. 2 is the schematic sectional view showing the multilayer ceramic capacitor of the present invention. In this multilayer ceramic capacitor, external electrodes 13 are formed on both ends of a capacitor body 11. The external electrodes 13 are formed by baking, for example, Cu or the paste of an alloy of Cu and Ni.

The capacitor body 11 is produced by alternately stacking dielectric layers 15 and internal electrode layers 17 one upon another. The dielectric layers 15 are configured by crystal grains 1 and grain boundary layers 19. The thickness of each of the dielectric layers 15 is preferably not more than 3 µm, particularly not more than 2.5 µm, for achieving a small-size and high-capacity multilayer ceramic capacitor. In the present invention, it is more preferable that the thickness variations of the dielectric layers 15 be within 10% in order to stabilize variations in electrostatic capacity and capacitance-temperature characteristics.

The internal electrode layers 17 are desirably a base metal, such as nickel (Ni) or copper (Cu), in order to suppress the manufacturing costs even when the number of layers is increased. Especially, nickel (Ni) is more desirable to permit the simultaneous sintering with the dielectric layers 15 according to the present invention.

<Method of Manufacturing Multilayer Ceramic Capacitor>

Figure 3:
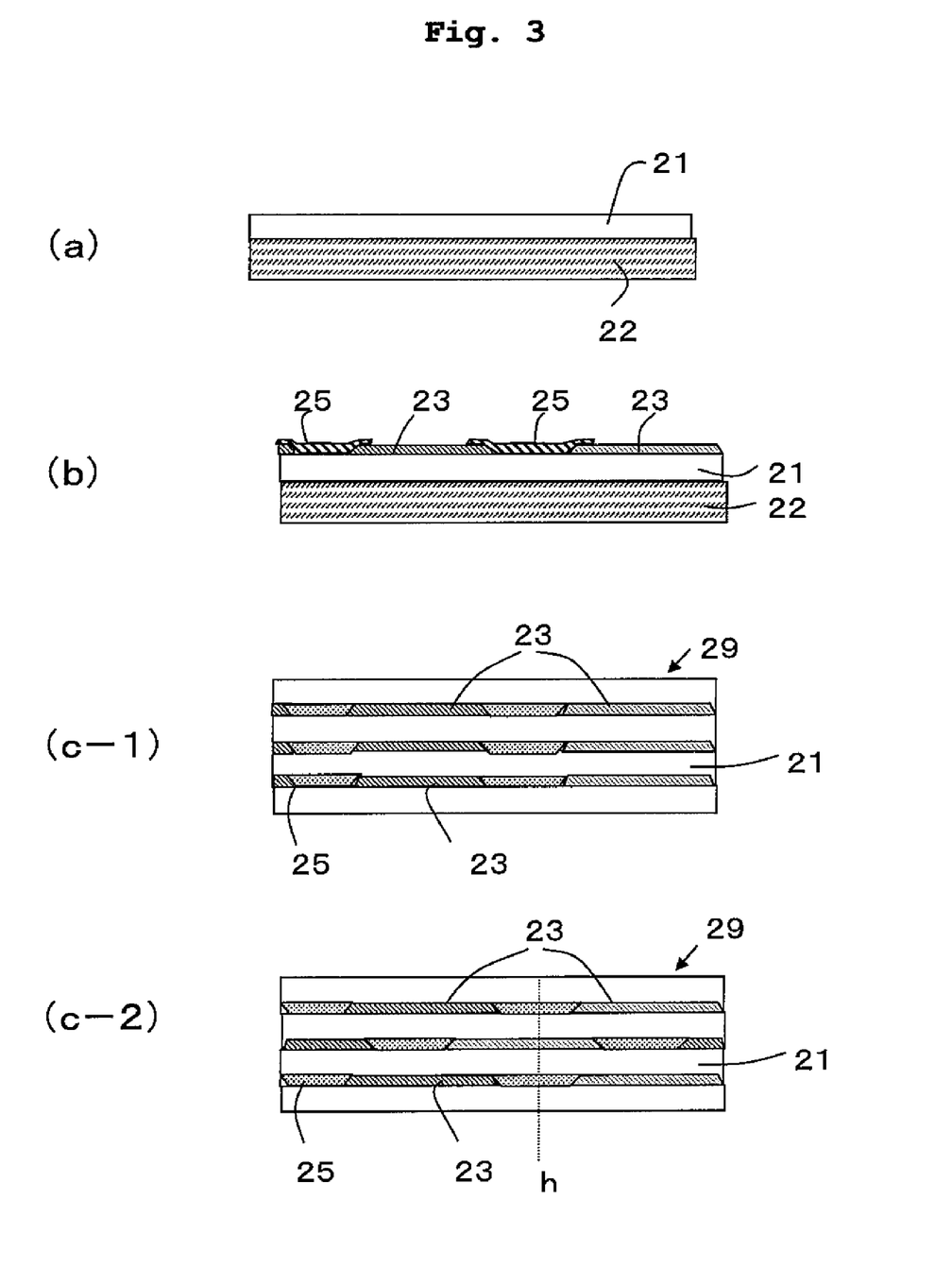
FIG. 3 is a process drawing showing a method of manufacturing the multilayer ceramic capacitor of one embodiment of the present invention.

The method of manufacturing a multilayer ceramic capacitor according to the present invention will be described in detail. FIG. 3 is a process drawing showing the method of manufacturing the multilayer ceramic capacitor of the present invention.

Step (a): In the method of the present invention, firstly, a ceramic slurry is prepared by mixing the above-mentioned dielectric powder and a glass powder serving as a sintering additive together with an organic resin such as polyvinyl butyral resin, and solvent such as toluene and alcohol by using a ball mill or the like. Next, with a sheet forming method such as doctor blade method or die coater method, a ceramic green sheet 21 is formed on a base material 22. The thickness of the ceramic green sheet 21 is preferably 1 µm to 4 µm in order to reduce the layer thickness and maintain high insulating properties for attaining a high capacity of the dielectric layers 15.

Step (b): A rectangular internal electrode pattern 23 is formed by printing on the main surface of the ceramic green sheet 21 obtained above. A conductor paste serving as the internal electrode pattern 23 is prepared by mixing Ni, Cu or an alloy powder of these as a main metal composition, and a ceramic powder as a common material, and then adding thereto an organic binder, solvent and dispersant. Preferably, the internal electrode pattern 23 has a thickness of not more than 1 µm, in order to minimize the multilayer ceramic capacitor and reduce gaps caused by the internal electrode pattern 23.

In the present invention, for the purpose of eliminating the gaps due to the internal electrode pattern 23 on the ceramic green sheet 21, it is preferable that a ceramic pattern 25 be formed around the internal electrode pattern 23 so as to have substantially the same thickness as the internal electrode pattern 23. For the purpose of attaining the same sintering shrinkage in the simultaneous sintering, it is preferable that the abovementioned dielectric powder be used as the ceramic component constituting the ceramic pattern 25.

Step (c): A temporary stacked body is formed by stacking a desired number of ceramic green sheets 21 each having the internal electrode pattern 23 formed thereon, and stacking on the upper and lower sides thereof a plurality of ceramic green sheets 21 having no internal electrode pattern 23, so that the upper and lower layers have the same number of layers. In the temporary stacked body, the internal electrode patterns 23 are longitudinally shifted one-half, respectively. This stacking method enables the internal electrode patterns 23 to be alternately exposed on the end faces of a cutaway stacked body 29.

In the present invention, instead of the above method of stacking after the internal electrode patterns 23 are formed in advance in the main surfaces of the ceramic green sheets 21, the following method may be employed. That is, after the ceramic green sheets 21 are temporarily adhered to the base material on the lower layer side, respectively, the internal electrode pattern 23 is printed and dried, and thereafter, the ceramic green sheets 21, on which no internal electrode pattern 23 is printed, are stacked one upon another on the dried internal electrode patterns 23 and temporarily adhered thereto. Thus, the adhesion of the ceramic green sheets 21 and the printing of the internal electrode patterns 23 are performed by turns.

The temporary stacked body is then pressed under the conditions of a higher temperature and a higher pressure than the temperature and the pressure in the above temporary stacking, thereby forming the stacked body 29 in which the ceramic green sheets 21 and the internal electrode patterns 23 are firmly adhered to each other.

Next, a capacitor body forming body is formed so that the ends of the internal electrode patterns 23 are exposed, by cutting the stacked body 29 along a cutting line h, that is, by cutting nearly the center of the ceramic pattern 25 formed in the stacked body 29 in a vertical direction with respect to the longitudinal direction of the internal electrode pattern 23 (refer to FIG. 3 (c1) and FIG. 3 (c2)), and cutting in parallel to the longitudinal direction of the internal electrode patterns 23. On the other hand, in the widest portions of the internal electrode patterns 23, the internal electrode patterns 23 are formed so as not to be exposed on the side margin portions.

Subsequently, a capacitor body 11 is formed by sintering the capacitor body forming body under the conditions of predetermined atmosphere and temperature. Depending on the case, barrel polishing may be employed to perform beveling of the ridge portions of the capacitor body 11, and expose internal electrode layers 17 exposed from the opposed end faces of the capacitor body 11. In the method of the present invention, the following conditions are preferred. That is, debinding is performed in the temperature range not exceeding 500° C., the temperature rising rate is 5 to 20° C./h, the maximum temperature of sintering temperature is in the range of 1100 to 1250° C., the temperature rising rate from the debinding to the maximum temperature is 200 to 500° C./h, the hold time at the maximum temperature is 0.5 to 4 hours, the temperature lowering rate from the maximum temperature to 1000° C. is 200 to 500° C./h in a hydrogen-nitrogen atmosphere, and the maximum temperature of heat treatment (reoxidation treatment) after sintering is 900 to 1100° C. in a nitrogen atmosphere.

Thereafter, external electrodes 13 are formed on the opposing ends of the above capacitor body 11 by applying an external electrode paste and baking. For the enhancement of packaging characteristics, a plating film is formed on the surfaces of the external electrodes 13.

Example

Multilayer ceramic capacitors were manufactured as follows. Table 1 shows the types, the average grain sizes, the amounts of addition and the sintering temperatures of raw material powders to be used. Here, there were used those in which a barium titanate powder (a BT powder) and a barium calcium titanate powder (a BCT powder) were coated with Mg, Y and Mn, and those mixed with the abovementioned powders without coating. As the BCT powder, $Ba_{0.95}Ca_{0.05}TiO_3$ was used.

The barium titanate powder (the BT powder) and the barium calcium titanate powder (the BCT powder) had an average grain size of 0.25 μm. When mixing the BT powder and the BCT powder, the equimolecular amounts of the BT powder and the BCT powder were mixed together, and the coating amounts of Mg, Mn and Y were prepared with respect to 100 parts by mass of the BT powder and the BCT powder. The A/B site ratio of the BT powder and the BCT powder was 1.003. The BT powder and the BCT powder mainly had a grain size of 0.2 to 0.4 μm. The composition of a glass powder was $SiO_2$=50, BaO=20, CaO=20 and $Li_2O$=10 (mole %).

Using zirconia balls having a diameter of 5 mm, the abovementioned powders were wet-mixed by adding a mixed solvent of toluene and alcohol as solvent. To the wet-mixed powders, polyvinyl butyral resin and a mixed solvent of toluene and alcohol were added and wet-mixed by using again zirconia balls having a diameter of 5 mm, thereby preparing a ceramic slurry. Using this ceramic slurry, a ceramic green sheet 21 having a thickness of 3 μm was manufactured by doctor blade method.

A plurality of rectangular internal electrode patterns 23 composed mainly of Ni were formed on the upper surface of the ceramic green sheet 21. The conductor paste used for the internal electrode patterns 23 was obtained by using Ni powder having an average grain size of 0.3 μm, and adding 30 parts by mass of the BT powder used in the green sheet 21 as a common material, to 100 parts by mass of the Ni powder.

Then, 360 pieces of the ceramic green sheets 21 having the internal electrode pattern 23 printed thereon were stacked one upon another to obtain a stacked body, and 20 pieces of ceramic green sheets 21, on which no internal electrode pattern 23 was printed, were stacked one upon another on the upper and lower surfaces of the stacked body, respectively. A press machine was used to perform batch laminating at a temperature of 60° C. and at a pressure of $1\times10^7$ Pa for 10 minutes, and then cut to a predetermined size.

The stacked forming body was then debindered at 300° C./h in the atmosphere at a temperature rising rate of 10° C./h, setting a temperature rising rate to 300° C./h from 500° C., and sintered for two hours at 1150 to 1200° C. in a hydrogen-nitrogen atmosphere. Subsequently, the sintered body was cooled to 1000° C. at a temperature lowering rate of 300° C./h, and reoxidized at 1000° C. in a nitrogen atmosphere for four hours, and then cooled at a temperature lowering rate of 300° C./h, thereby manufacturing a capacitor body 11. This capacitor body 11 had a size of $2\times1.3\times1.3$ mm$^3$, and the dielectric layer 15 was 2 μm thick.

After the sintered electronic component body was subjected to barrel polishing, an external electrode paste containing a Cu powder and glass was applied to both ends of the electronic component body, followed by baking at 850° C., resulting in the external electrodes 13. Thereafter, using an electrolytic barrel machine, Ni plating and Sn plating were performed in this order on the surfaces of the external electrodes 13, thereby manufacturing the multilayer ceramic capacitor.

As comparative examples, multilayer ceramic capacitors were manufactured with the same method as described above by preparing a first comparative example to which no zirconium oxide powder was added, a second comparative sample in which the amount of zirconium oxide was beyond the range of the present invention, and a third comparative example in which a barium titanate based powder and the oxide of Mg, Y and Mn were batch mixed without coating the Mg, the Y and the Mn on the barium titanate based powder.

Next, these multilayer ceramic capacitors were evaluated as below. The concentration ratio of the element existing in the crystal grains 1 was obtained as a count ratio, by an electron probe micro-analyzer (EPMA) equipped with an electron microscope. In this case, the existing condition of the element was detected, while scanning the crystal grains 1 from the surface side 5 to the central part thereof. In the element concentration on the surface side 5 of the crystal grains 1, the concentration value of a region located 2 to 5 nm inside from the surface was defined as the concentration of the surface side 5. Three pieces of the crystal grains 1 were arbitrarily selected to evaluate the concentration ratio thereof. In the dielectric ceramic in which BT crystal grains and BCT crystal grains were complexed, the average value of these two types of crystal grains 1 was employed.

Electrostatic capacity, relative dielectric constant and the temperature characteristics of relative dielectric constant were measured at a frequency of 1.0 kHz and a measured voltage of 0.5 Vrms. The relative dielectric constant was calculated from the electrostatic capacity, the effective area of the internal electrode layer 17 and the thickness of the dielectric layer 15.

A highly accelerated life test at a temperature of 125° C., at a voltage 9.45V and for 1000 hours was conducted and evaluated (MTTF). In this test, 30 samples were used.

To evaluate the reliability of the multilayer ceramic capacitors, the grain boundary layers were evaluated by alternating current impedance method. In the resistance evaluations of grain boundaries within the dielectric layer 15 by the alternating current impedance method, the multilayer ceramic capacitors were left in a high temperature load atmosphere having a temperature of 1.5 times higher than the Curie temperature exhibited by perovskite-type barium titanate crystal grains constituting the dielectric layer 15, and having a voltage of not less than ⅓ of the rated voltage of the multilayer ceramic capacitor. The decrease rate of the resistance of the grain boundary layers 19 within the dielectric layer 15 in the alternating current impedance measurement (call-call plot) was determined under the same conditions before and after leaving the sample in the high temperature load atmosphere under the abovementioned conditions.

The average grain sizes of the BT type crystal grains and the BCT type crystal grains, each constituting the dielectric layer 15, were obtained by using the abovementioned image analyzer (the Macview). The samples were used after etching their respective polishing surfaces. The average value and a D90 (a 90% accumulated value from a small diameter to a large diameter) of these crystal grains were obtained.

The Ca concentrations at arbitrary locations in the vicinity of the central part were analyzed by using a transmission electron microscope and an energy dispersive X-ray analyzer (EDS). At that time, those having a Ca concentration higher than 0.4 atomic percent (rounding to one decimal) were regarded as dielectric grains having a high Ca concentration. This analysis was made on 100 to 150 pieces of the primary crystal grains.

The results are shown in Tables 1 and 2.

TABLE 1

| | | BT Powder | | | | BCT Powder | | |
| | | Amount of addition | | | | Amount of addition | | |
| Sample No. | Coat | Mg Parts by mass | Y Parts by mass | Mn Parts by mass | Coat | Mg Parts by mass | Y Parts by mass | Mn Parts by mass |
| --- | --- | --- | --- | --- | --- | --- | --- | --- |
| *1 | Yes | 0.022 | 0.122 | 0.023 | Yes | 0.065 | 0.37 | 0.069 |
| 2 | Yes | 0.022 | 0.122 | 0.023 | Yes | 0.065 | 0.37 | 0.069 |
| 3 | Yes | 0.022 | 0.122 | 0.023 | Yes | 0.065 | 0.37 | 0.069 |
| 4 | Yes | 0.022 | 0.122 | 0.023 | Yes | 0.065 | 0.37 | 0.069 |
| 5 | Yes | 0.022 | 0.122 | 0.023 | Yes | 0.065 | 0.37 | 0.069 |
| *6 | Yes | 0.022 | 0.122 | 0.023 | Yes | 0.065 | 0.37 | 0.069 |
| 7 | Yes | 0.087 | 0.492 | 0.092 | No | 0 | 0 | 0 |
| 8 | No | 0 | 0 | 0 | Yes | 0.087 | 0.492 | 0.092 |
| *9 | No | 0.022 | 0.122 | 0.023 | No | 0.065 | 0.37 | 0.069 |

| | | Glass Powder | | | | | |
| Sample No. | Mean grain size μm | Amount of addition Parts by mass | Alumina content % by mass | $BaCO_3$ Parts by mass | $ZrO_2$ Parts by mass | Sintering Temperature ° C. |
| --- | --- | --- | --- | --- | --- | --- |
| *1 | 0.5 | 1.2 | 0.08 | 0.43 | 0 | 1155 |
| | | | | | | 1170 |
| | | | | | | 1185 |
| | | | | | | 1200 |
| 2 | 0.5 | 1.2 | 0.08 | 0.43 | 0.04 | 1155 |
| | | | | | | 1170 |
| | | | | | | 1185 |
| | | | | | | 1200 |

TABLE 1-continued

| | | | | | | | |
|---|---|---|---|---|---|---|---|
| 3 | 0.5 | 1.2 | 0.08 | 0.43 | 0.06 | 1155 |
| | | | | | | 1170 |
| | | | | | | 1185 |
| | | | | | | 1200 |
| 4 | 0.5 | 1.2 | 0.08 | 0.43 | 0.1 | 1155 |
| | | | | | | 1170 |
| | | | | | | 1185 |
| | | | | | | 1200 |
| 5 | 0.5 | 1.2 | 0.08 | 0.43 | 0.2 | 1155 |
| | | | | | | 1170 |
| | | | | | | 1185 |
| | | | | | | 1200 |
| *6 | 0.5 | 1.2 | 0.08 | 0.43 | 0.25 | 1155 |
| | | | | | | 1170 |
| | | | | | | 1185 |
| | | | | | | 1200 |
| 7 | 0.5 | 1.2 | 0.08 | 0.43 | 0.1 | 1155 |
| | | | | | | 1170 |
| | | | | | | 1185 |
| | | | | | | 1200 |
| 8 | 0.5 | 1.2 | 0.08 | 0.43 | 0.1 | 1155 |
| | | | | | | 1170 |
| | | | | | | 1185 |
| | | | | | | 1200 |
| *9 | 0.5 | 1.2 | 0.08 | 0.43 | 0.1 | 1155 |
| | | | | | | 1170 |
| | | | | | | 1185 |
| | | | | | | 1200 |

The samples marked "*" are out of the scope of the present invention.

TABLE 2

| Sample No. | Concentration ratio of surface side to central part in crystal grains of Y | Mean grain size of crystal grains (BT, BCT) after sintering μm | Grain size (D90) of crystal grains (BT, BCT) after sintering μm | A/B site ratio (A:Ba, Ca, B:Ti) | Electrostatic capacity μF | Relative dielectric constant | Temperature change ratio of the electrostatic capacity at 125° C. % |
|---|---|---|---|---|---|---|---|
| *1 | 2 | 0.25 | 0.42 | 1.005 | 9.4 | 3500 | −13.9 |
| | 2 | 0.25 | 0.42 | | 9.4 | 3500 | −13.7 |
| | 2.1 | 0.26 | 0.44 | | 9.3 | 3550 | −13.7 |
| | 2.2 | 0.26 | 0.44 | | 9.3 | 3600 | −13.6 |
| 2 | 2 | 0.26 | 0.43 | 1.005 | 9.6 | 3580 | −14.6 |
| | 2 | 0.26 | 0.43 | | 9.6 | 3590 | −14.4 |
| | 2.1 | 0.27 | 0.45 | | 9.5 | 3650 | −14.3 |
| | 2.2 | 0.27 | 0.44 | | 9.4 | 3640 | −14.3 |
| 3 | 2 | 0.26 | 0.43 | 1.005 | 9.7 | 3600 | −14.4 |
| | 2 | 0.27 | 0.43 | | 9.7 | 3600 | −14.4 |
| | 2.1 | 0.27 | 0.45 | | 9.6 | 3640 | −14.1 |
| | 2.2 | 0.27 | 0.44 | | 9.5 | 3660 | −14.0 |
| 4 | 2 | 0.26 | 0.43 | 1.005 | 9.8 | 3640 | −14.0 |
| | 2 | 0.26 | 0.44 | | 9.8 | 3640 | −13.8 |
| | 2.1 | 0.28 | 0.45 | | 9.5 | 3690 | −13.8 |
| | 2.2 | 0.27 | 0.44 | | 9.5 | 3690 | −13.7 |
| 5 | 2 | 0.25 | 0.42 | 1.005 | 9.8 | 3660 | −14.2 |
| | 2 | 0.26 | 0.42 | | 9.7 | 3670 | −14.3 |
| | 2.1 | 0.26 | 0.43 | | 9.6 | 3700 | −14.1 |
| | 2.2 | 0.26 | 0.43 | | 9.5 | 3700 | −14.0 |
| *6 | 2 | 0.26 | 0.43 | 1.005 | 9.8 | 3670 | −15.9 |
| | 2 | 0.27 | 0.44 | | 9.7 | 3680 | −15.7 |
| | 2.1 | 0.28 | 0.45 | | 9.7 | 3730 | −15.8 |
| | 2.2 | 0.27 | 0.45 | | 9.6 | 3740 | −15.6 |
| 7 | 1.9 | 0.28 | 0.48 | 1.005 | 9.8 | 3640 | −14.2 |
| | 1.9 | 0.29 | 0.49 | | 9.9 | 3660 | −14 |
| | 2 | 0.31 | 0.5 | | 9.6 | 3690 | −13.9 |
| | 2.1 | 0.31 | 0.5 | | 9.5 | 3690 | −13.7 |
| 8 | 2.1 | 0.28 | 0.46 | 1.005 | 9.8 | 3640 | −14.1 |
| | 2.1 | 0.29 | 0.47 | | 9.8 | 3640 | −13.9 |
| | 2.2 | 0.3 | 0.49 | | 9.6 | 3710 | −13.8 |
| | 2.2 | 0.3 | 0.49 | | 9.5 | 3690 | −13.7 |
| *9 | 1.2 | 0.3 | 0.51 | 1.003 | 9.4 | 3510 | −16 |
| | 1.2 | 0.3 | 0.52 | | 9.4 | 3530 | −15.8 |

TABLE 2-continued

| | | | | | |
|---|---|---|---|---|---|
| 1.3 | 0.31 | 0.53 | 9.3 | 3590 | −15.8 |
| 1.4 | 0.32 | 0.54 | 9.3 | 3620 | −15.7 |

| Sample No. | Determination that satisfy X7R standard | BDV V | Time of occurring initial defect (125° C. × 9.45 V) hours | (125° C., 9.45 V, 1000 hours) Existence of defect | Evaluation of grain boundary layer by alternating current impedance method Variation in resistance ratio before and after high temperature load treatment % |
|---|---|---|---|---|---|
| *1 | ○ | 165 | 3699 | Absence | −0.3 |
|  | ○ | 157 | 3393 | Absence | −0.3 |
|  | ○ | 157 | 2720 | Absence | −0.4 |
|  | ○ | 158 | 1863 | Absence | −0.4 |
| 2 | ○ | 163 | 3630 | Absence | −0.4 |
|  | ○ | 157 | 3400 | Absence | −0.4 |
|  | ○ | 157 | 2680 | Absence | −0.5 |
|  | ○ | 156 | 1850 | Absence | −0.5 |
| 3 | ○ | 164 | 3640 | Absence | −0.3 |
|  | ○ | 157 | 3410 | Absence | −0.4 |
|  | ○ | 157 | 2680 | Absence | −0.4 |
|  | ○ | 155 | 1880 | Absence | −0.4 |
| 4 | ○ | 165 | 3700 | Absence | −0.3 |
|  | ○ | 158 | 3392 | Absence | −0.3 |
|  | ○ | 158 | 2700 | Absence | −0.4 |
|  | ○ | 159 | 1880 | Absence | −0.4 |
| 5 | ○ | 164 | 3655 | Absence | −0.3 |
|  | ○ | 157 | 3299 | Absence | −0.4 |
|  | ○ | 156 | 2688 | Absence | −0.4 |
|  | ○ | 158 | 1890 | Absence | −0.4 |
| *6 | X | 159 | 3490 | Absence | −0.3 |
|  | X | 158 | 3290 | Absence | −0.3 |
|  | X | 155 | 2490 | Absence | −0.4 |
|  | X | 155 | 1720 | Absence | −0.4 |
| 7 | ○ | 165 | 3510 | Absence | −0.5 |
|  | ○ | 164 | 3310 | Absence | −0.5 |
|  | ○ | 160 | 2520 | Absence | −0.6 |
|  | ○ | 159 | 1740 | Absence | −0.6 |
| 8 | ○ | 166 | 3530 | Absence | −0.5 |
|  | ○ | 165 | 3340 | Absence | −0.5 |
|  | ○ | 160 | 2550 | Absence | −0.6 |
|  | ○ | 159 | 1780 | Absence | −0.6 |
| *9 | X | 160 | 3500 | Absence | −0.7 |
|  | X | 159 | 3290 | Absence | −0.7 |
|  | X | 160 | 2510 | Absence | −0.8 |
|  | X | 158 | 1720 | Absence | −1 |

The samples marked "*" are out of the scope of the present invention.

As apparent from the results of Tables 1 and 2, in the samples manufactured by using the barium titanate based powder in which Mg, Y and Mn were coated on the barium titanate based crystal grains 1, the Y was present in the vicinity of the surface (the grain boundary) at a ratio of nearly two times or above greater than the inside of the crystal grains 1.

By comparison of Samples Nos. 2 to 8, to which zirconium oxide was added, with Sample No. 1, to which no zirconium oxide wad added, the followings were confirmed. That is, in Samples Nos. 2 to 8, even if Mg, Y and Mn were coated on the barium titanate based crystal grains 1, the dielectric constant was as high as 3580 or above, the temperature change ratio of the electrostatic capacity at 125° C. to that at 20° C. was within −15%, the dielectric breakdown voltage (BDV) was 155V or above, the endurance time in the high temperature load test (125° C., 9.45 v) was 1740 hours or above, and the resistance change ratio by alternating current impedance method was −0.6% or below.

Especially, in the dielectric ceramics (Samples Nos. 2 to 5), in which as the barium titanate based crystal grains 1, first crystal grains 1a having a Ca concentration of not more than 0.2 atomic percent, and second crystal grains 1b having a Ca concentration of not less than 0.4 atomic percent were complexed by using a BT powder and a BCT powder, each of which was coated with Mg, Y and Mn, the dielectric constant was high, and the temperature characteristics of dielectric constant retained the X7R characteristics even if the sintering temperature was changed. The resistance change ratio by alternating current impedance method was −0.5% or below, exhibiting high reliability.

On the other hand, in Sample No. 1, in which Mg, Y and Mn were coated on the barium titanate based crystal grains 1, but no zirconium oxide was added, the dielectric constant was lower than the samples of the present invention.

In Sample No. 6, in which a larger amount of zirconium oxide was added than the specified amount of the present invention, the temperature change ratio of the electrostatic capacity at 125° C. to that at 20° C. was over −15%.

In Sample No. 9, in which the oxides of Mg, Y and Mn were batch mixed together with zirconium oxide, without coating Mg, Y and Mn on the barium titanate based crystal grains 1, the concentration ratio of the Y in the surface side 5 of the crystal grains 1 to the central part thereof was smaller than 2, and the temperature change ratio of the electrostatic capacity was over −15%.

The invention claimed is:

1. A dielectric ceramic comprising:

primary crystal grains comprising a composite oxide having first crystal grains comprising Ti, Ca and Ba, said first crystal grains having a Ca concentration of not more than 0.2 atomic percent, said primary crystal grains further comprise second crystal grains comprising a composite oxide comprised of Ti, Ca and Ba, and having a Ca concentration of not less than 0.4 atomic percent, and wherein the total amount of Ba and Ca is an amount A mol, and the amount of Ti is an amount B mol, the mole ratio (A/B) is not less than 1.003, wherein the primary crystal grains further comprise metal elements of Mg, Mn and a rare earth element, and at least one of the metal elements is present at a higher concentration on the surface side of the primary crystal grains than the inside thereof, a concentration ratio thereof (the surface side/the inside) being at least 1.5, wherein 0.04 to 0.2 parts by mass of Zr in terms of oxide to 100 parts by mass of the total amount of the composite oxides comprising the first crystal grains and the second crystal grains is contained, and wherein the dielectric constant of the ceramic composition is 3580 or above.

2. The dielectric ceramics according to claim 1 wherein the primary crystal grains have an average grain size of not more than 0.4 μm.

3. A method of manufacturing the dielectric ceramic according to claim 1 comprising a step of adding 0.04 to 0.2 parts by mass of zirconium oxide to 100 parts by mass of a dielectric powder in which Mg, Mn and a rare earth element are coated on the surface of a mixed powder of a barium titanate powder and a barium calcium titanate powder, followed by forming and then sintering.

4. The method of manufacturing a dielectric ceramic according to claim 3, wherein the dielectric powder has an average grain size of not more than 0.3 μm.

5. A multilayer ceramic capacitor having a capacitor body in which dielectric layers and internal electrode layers are alternately stacked one upon another, wherein the dielectric layers are the dielectric ceramic according to claim 1.

* * * * *